US009658944B2

(12) United States Patent
Ganda et al.

(10) Patent No.: US 9,658,944 B2
(45) Date of Patent: May 23, 2017

(54) GENERIC TEST AUTOMATION FOR GRAPHICAL USER INTERFACE (GUI) APPLICATIONS (71) Applicant: CA, Inc., New York, NY (US)

(72) Inventors: Madhusudhan Ganda, Kadapa (IN); Abhijit Pati, Bengaluru (IN); Saorabh Singh, Bangalore (IN); Vikrant Nandakumar, Bangalore (IN)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/830,962

(22) Filed: Aug. 20, 2015

(65) Prior Publication Data
US 2017/0052877 A1 Feb. 23, 2017

(51) Int. Cl.
G06F 9/44 (2006.01)
G06F 11/36 (2006.01)
G06F 3/0484 (2013.01)

(52) U.S. Cl.
CPC ........ *G06F 11/3664* (2013.01); *G06F 3/0484* (2013.01); *G06F 11/3692* (2013.01)

(58) Field of Classification Search
CPC . G06F 11/3664; G06F 11/3692; G06F 3/0484
See application file for complete search history.

(56) References Cited

U.S. PATENT DOCUMENTS

| | | | |
|---|---|---|---|
| 5,745,767 A * | 4/1998 | Rosen | G06F 11/3684 714/E11.208 |
| 5,781,720 A | 7/1998 | Parker et al. | |
| 7,856,619 B2 | 12/2010 | He et al. | |
| 8,645,919 B2 | 2/2014 | Gooi et al. | |
| 8,739,126 B2 | 5/2014 | Glaser et al. | |
| 8,745,641 B1 * | 6/2014 | Coker | G06F 11/3668 719/313 |
| 2005/0223360 A1 * | 10/2005 | Seeman | G06F 11/3696 717/124 |
| 2005/0228644 A1 | 10/2005 | Wang | |
| 2005/0229161 A1 | 10/2005 | Wang et al. | |
| 2007/0156864 A1 * | 7/2007 | McCoy | G06F 9/545 709/222 |
| 2009/0265689 A1 * | 10/2009 | Gooi | G06F 11/3688 717/125 |

(Continued)

OTHER PUBLICATIONS

Related U.S. Appl. No. 14/831,050; entitled "Generic Test Automation or Restful Web Services Applications," filed Aug. 20, 2015 by Madhusudhan Ganda.

(Continued)

*Primary Examiner* — Chameli Das
(74) *Attorney, Agent, or Firm* — Stevens & Showalter, LLP (57) ABSTRACT A method for generic test automation comprises mapping generic interface commands for objects to be tested to tool-specific interface commands of a test automation tool. An application-specific element map based on an application for test is identified, and the application-specific element map includes label names for the elements of the application-specific element map. Application-specific user actions, which are created based on the generic interface commands and the application-specific element map, are sent to the test automation tool for testing the application.

16 Claims, 6 Drawing Sheets (56) References Cited

U.S. PATENT DOCUMENTS

2012/0059919 A1*  3/2012  Glaser ................. G06F 11/3672
                                              709/223
2013/0055028 A1   2/2013  Patil et al.
2014/0053166 A1*  2/2014  Moore ...................... G06F 9/54
                                              719/316
2014/0075242 A1   3/2014  Dolinina et al.

OTHER PUBLICATIONS

Bourzik, Brahm; Office Action; U.S. Appl. No. 14/831,050; dated Apr. 19, 2016; United States Patent & Trademark Office, Alexandria.

* cited by examiner

| Test Operation ID | Test Operations | EXPECTED_OUTPUT_CONFIG |
|---|---|---|
| 1 | Login | VERIFY_ELEMENT_PRESENCE_MAINNAVLINK=true |
| 2 | CreateUser | VERIFY_TEXT_FROM_ELEMENT_DEFAULT_STORE=S(TENANT)-USERSTORE |
| 3 | Logout | VERIFY_ELEMENT_PRESENCE_PASSWORD=true |
| 4 | FYP | VERIFY_MESSAGE_SUCCESS=Your OTP is sent to the registered email. Please |

FIG. 4

| Data Set | username | password | tenant name | sign in | forgot password |
|---|---|---|---|---|---|
| LoginValidPwd | username1 | valid_pwd | tenant1 | yes | no |
| LoginInvalidPwd | username1 | invalid_pwd | tenant2 | yes | no |

GENERIC TEST AUTOMATION FOR GRAPHICAL USER INTERFACE (GUI) APPLICATIONS

CROSS-REFERENCE TO RELATED APPLICATIONS

This application is related to U.S. patent application Ser. No. 14/831,050 entitled GENERIC TEST AUTOMATION FOR RESTFUL WEB SERVICES APPLICATIONS by Ganda et al., which is filed concurrently herewith; the entirety of which is incorporated by reference.

BACKGROUND

Various aspects of the present disclosure relate generally to testing applications and specifically to automated testing of graphical user interface applications. Therefore, the present disclosure advances an improvement in the technical field of application development and testing.

Software applications require extensive testing before being released to the general public to ensure proper functionality. Basically, application-specific test cases (with sets of test operations) pair with application specific test data in a test driver, which is used to test the application. In the case of graphical-user-interface (GUI) applications, an element map specific to the GUI under test is used with the test driver to test each page of the application in an automation tool (e.g., Selenium, HP UFT (Hewlett Packard Unified Functional Testing), Appium, etc.). (Selenium is a registered trademark of Software Freedom Conservancy, a corporation of New York, located at 137 Montague Street, Suite 380, Brooklyn, N.Y. 11201. HP is a registered trademark of Hewlett-Packard Development Company, L.P., a limited partnership of Texas, located at 11445 Compaq Center Drive, West Houston, Tex. 77070.)

During testing, if an exception occurs, then if the error is due to a change in a GUI screen, then the application, mapping, test cases, test data, or combinations thereof must be analyzed and updated. However, if the exception is not due to a change in screen, then an error is reported. If no exceptions occur, then a verification manager determines whether the test was successful or not and reports either success or an error.

Through extensive testing, software developers may ensure a more robust release of the application under test.

BRIEF SUMMARY

According to aspects of the present disclosure, a method for generic test automation comprises mapping generic interface commands for objects to be tested to tool-specific interface commands of a test automation tool. An application-specific element map based on an application for test is identified, and the application-specific element map includes label names for the elements of the application-specific element map. Application-specific user actions, which are created based on the generic interface commands and the application-specific element map, are sent to the test automation tool for testing the application.

According to further aspects of the present disclosure, an application-specific test case is translated to the application-specific user actions, and values from application-specific test data are used to populate the application-specific user actions. The populated application-specific user actions are translated to the generic interface commands to create populated generic interface commands, which are translated to tool-specific interface commands based on the mapping of the generic interface commands to tool-specific interface commands.

DETAILED DESCRIPTION

According to aspects of the present disclosure, software application test automation is performed using a generic mapping between a test automation tool and application-specific test cases and data. Thus, application-specific test cases (which are a sequence of test steps) and application-specific test data (which supply values to the application test cases) are isolated from the test automation tool and the elements within the application itself in some regard.

Basically, generic interface commands (i.e., interface commands that may be used across applications and across test automation tools) are created and mapped to one or more tool-specific commands of one or more test automation tools. Further, application-specific user actions (i.e., simulated user actions) are created based on the generic interface commands and elements of an application under test. Thus, the user actions are specific to the application, but generic to test automation tools.

Figure 1:
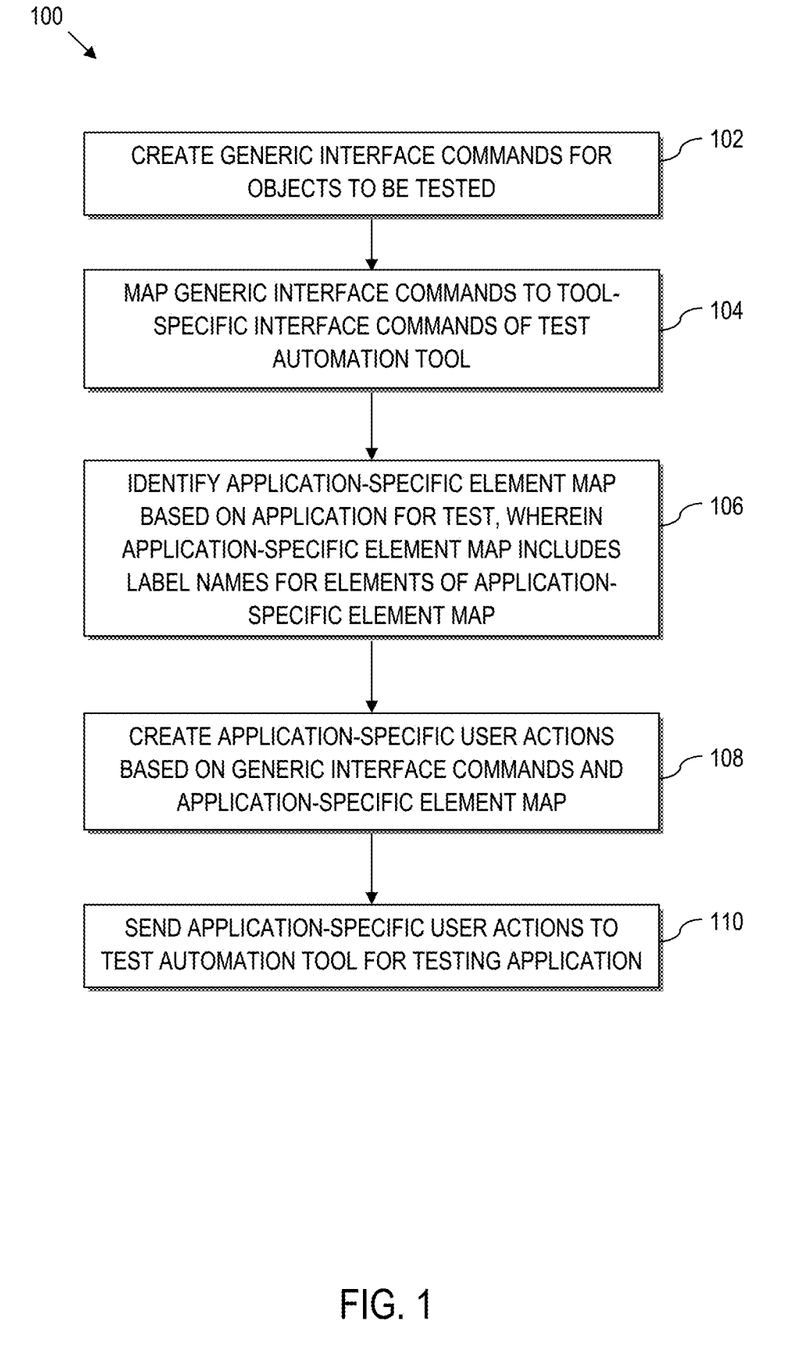
FIG. 1 is a flow chart illustrating a method for generic test automation, according to various aspects of the present disclosure.

Referring now to FIG. 1, a method 100 for generic test automation of an application is presented. In this regard, the method 100 may be implemented on computer-readable hardware that stores machine-executable program code, where the program code instructs a processor to implement the described method. The method 100 may also be executed by a processor coupled to memory, where the processor is programmed by program code stored in the memory, to perform the described method.

At 102, generic interface commands for objects in general to be tested are created. For example, in a graphical user interface (GUI) application, generic interface commands may be created for objects found in GUI applications (e.g., setInputField, click, selectFromList, focus, launch, close, verify, switchToFrame, waitForElementToLoad, setCheckBox, etc.). While these generic interface commands may be of any language or verbiage, the generic interface commands should be easy to understand based on the commands themselves. For example, setInputField is used to set text in an input field of a GUI screen.

At 104, the generic interface commands are mapped to tool-specific interface commands of a test automation tool in any practical way (e.g., via an application programming interface). For example, the command "check" is used in Selenium to place a check in a check box. Thus, when mapping the generic interface commands to the Selenium commands, setCheckBox is mapped to "check" in Selenium. However, to check a checkbox in HP UFT, the command is "set" with an object of the command being the checkbox. Therefore, the generic interface command setCheckBox would be mapped to "set" in HP UFT. As such, the generic interface commands may be mapped to different test automation tools via the mapping at 104. Also, different versions of the same tool may have different application programming interfaces (APIs). If so, then the generic interface commands may be mapped to different versions of the same test automation tool, which allows for easy upgrading of test automation tools.

At 106, an application-specific element map of an application for test is identified, and elements of the element map include a label name. For example, if the application for testing is a GUI application, then elements of the GUI application may be automatically created from the GUI application by parsing source code of the application and finding the screens and elements within the GUI. As another example, the list of elements may be received from a separate tool or the application itself.

The application-specific element map may take any form and any language. However, the application map should include meaningful application-specific label names (e.g., username, password, etc.), which may be determined from the source code of the application itself, as shown below.

```
<?xml version="1.0" encoding="UTF-8"?>
<UIElementMap>
    <Login>
        <Username type="input" by="ID" value="username" />
        <Password type="input" by="ID" value="password" />
        <TenantName type="input" by="ID" value="tenantId" />
        <SignIn type="button" by="ID" value="attemptLogin" />
        <errorMessage type="output" by="ID" value="formError" />
        <mainnavlink type = "output" by = CSS, value="#main" />
    </Login>
<FYP>
        <forgotpassword type = "link" by="ID" value=
        "forgotpassword" />
        <username type="input" by="ID" value="email" />
        <otp type="input" by="ID" value="one_time_password" />
        <newPassword type="input" by="ID" value="newpassword" />
        <confirmPassword type="input" by="ID" value=
        "confirmpassword" />
        <resetPassword type="button" by="ID" value=
        "resetPassword" />
        <fypErrorMessage type="output" by="ID" value=
        "fypErrorMsg" />
        <fypSuccessMessage type="output" by="ID" value=
        "resetMsg" />
</FYP>
    <Logout>
    ...
    </Logout>
    ...
</UIElementMap>
```

The application-specific element map shown above maps to a GUI screen that includes three text boxes (e.g., username, password, and tenant name), a "sign in" button, and a "forgot password" link, resulting in a screen similar to the screen illustrated in FIG. 3, discussed below in an example of the method 100. As noted above, the application-specific element map is specific to the application under test. Since the application-specific element map may be auto-generated, label names may be taken from a screen label if the screen labels are meaningful. Otherwise, the label names in the application-specific element map may be given application agnostic names. For example, the output label "errorMessage" is not necessarily application specific (i.e., application agnostic) but is easily understood by a user as an error message, but application-specific elements may be included in the value (e.g., value="formError").

The application-specific element map may be represented in any desired way. For example, the application-specific element map may be written in extensible markup language (XML) as shown above, as a spreadsheet, etc.

At 108, application-specific user actions are created based on the application-specific element map and the generic interface commands. For example, the user actions may be based on a screen label from the application-specific element map and may use the generic interface commands as functions within each user action, where variables for the function are defined by labels within the application-specific element map.

For example, a user action that simulates a user interacting with the login screen may include the generic interface actions setInputField and click, because there are three boxes, a button, and a link on the Login screen. As such, the application-specific user action for the Login screen may be:

Login=setInputField(username, password, tenant name), click(sign in)

In the example above, Login is a logical name for the user action and is not necessarily tied to a login screen (which may be named Login, Sign-In, etc.). Once the logical name for the user action is defined, then elements from a screen (e.g., username, password, etc.) may be defined.

Figure 4:
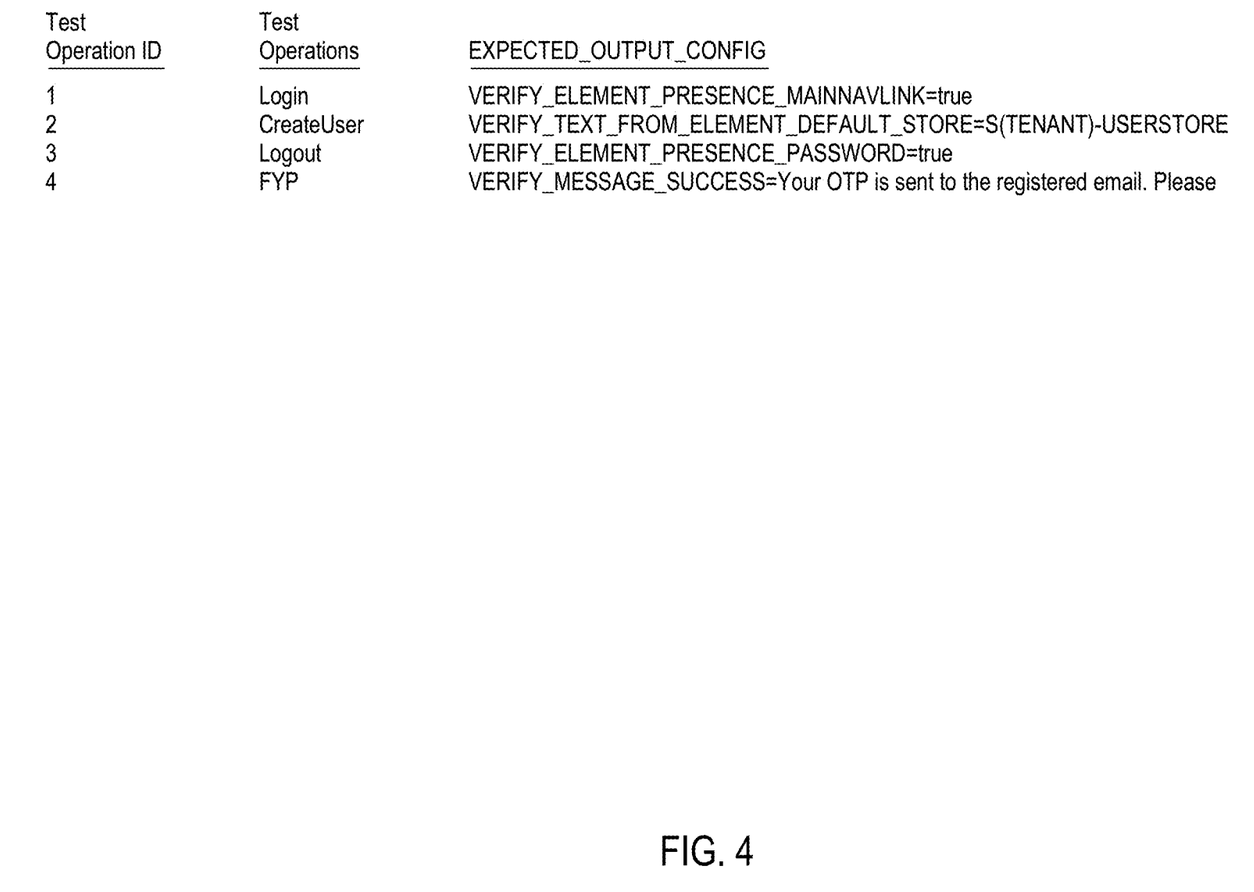
FIG. 4 is a chart illustrating an application-specific test case with operations used for the example, according to various aspects of the present disclosure.
Figure 5:
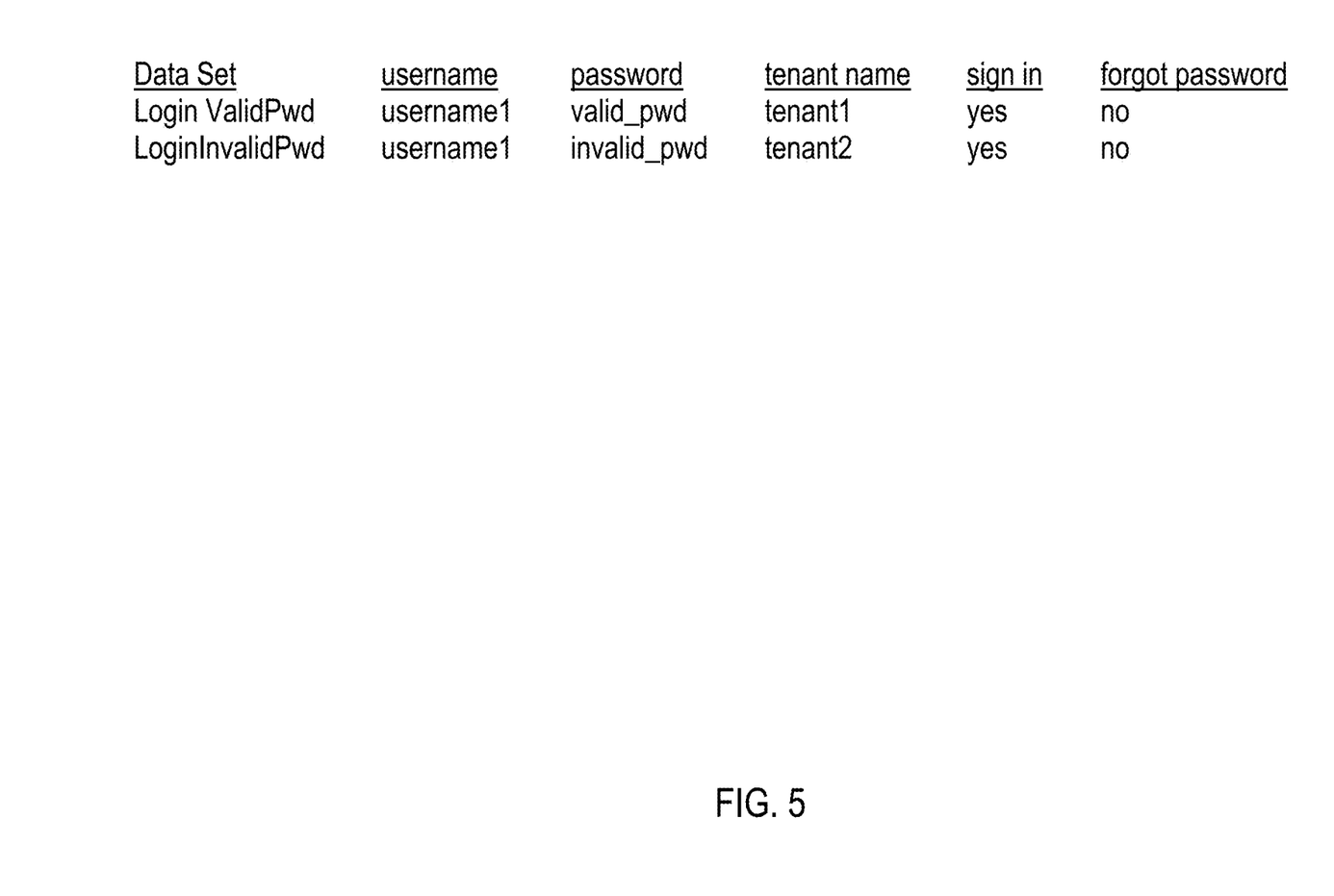
FIG. 5 is a chart illustrating an application-specific data set used for the example, according to various aspects of the present disclosure.

A user may then create an application-specific test case by creating a sequence of the application-specific user actions. Further, the user may include application-specific test data to supply values for the user actions within the test case. An example of an application-specific test case is shown in FIG. 4, and an example of application-specific test data is shown in FIG. 5 and will be discussed in greater detail below.

The application-specific test case (i.e., sequence of application-specific user actions) is used as an input to the test automation tool, which fills in values for the generic interface commands using the application-specific test data, as discussed above. At 110, the application-specific user actions are sent to the test automation tool for testing the application, and the generic interface commands of the application-specific user actions are translated to the tool-specific interface commands using the mapping created at 104. Thus, the application-specific user actions are isolated from whichever tool is used to run the test automation. The translation of the generic interface commands to tool-specific commands may be performed before or during testing.

The method 100 allows a user to create application-specific test cases and application-specific test data using generic interface commands. Thus, users do not need to learn specific scripting or programming languages for test automation. Instead, the users may use plain English to create the application-specific test cases and application-specific test data based on the generic interface commands. Further, the method 100 allows portability between tools. For example, if a test is written for Selenium, then to port to HP UFT, the user just needs to specify a different mapping (e.g., at 104 above). Therefore, the user does not need to know which test automation tool will be used to test the application.

Figure 2:
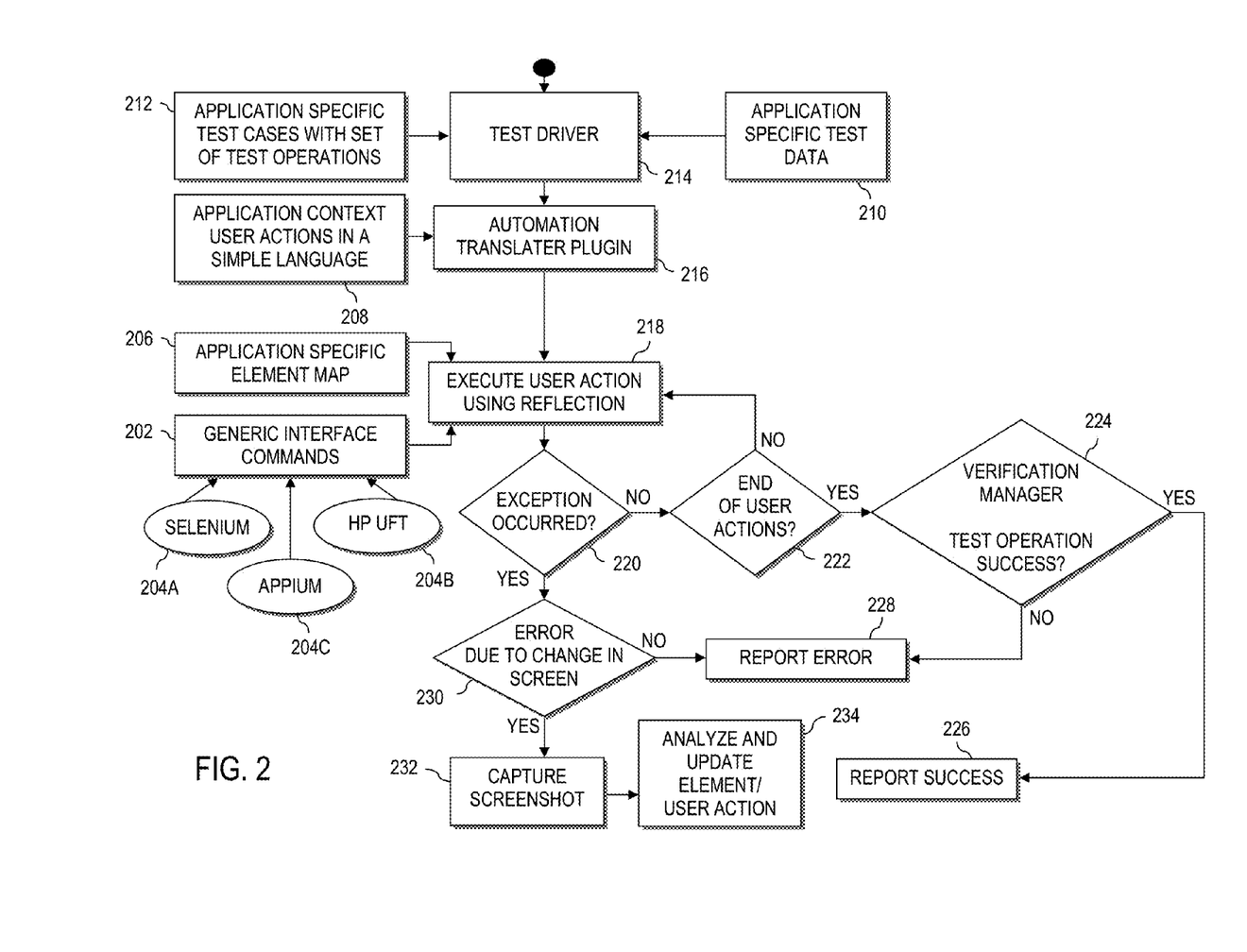
FIG. 2 is a flow chart illustrating a method for generic test automation and verification for graphical user interface (GUI) applications, according to various aspects of the present disclosure.

Referring now to FIG. 2, a flow chart illustrates an overall test flow 200 according to various aspects of the present disclosure. Generic interface commands 202 are created (102, FIG. 1) and mapped to an exposed application programming interface (API) 204a-c of a test automation tool (104, FIG. 1). Further, an application-specific element map 206 is created from source code of an application under test (106, FIG. 1). From the generic interface commands 202 and the application-specific element map 206, application-specific user actions 208, which are used to simulate user actions within the test automation tool, are created (108, FIG. 1). The generic interface commands 202, application-specific element map 206, and application-specific user actions 208 may then be used for testing the application in a test automation tool to which the generic interface commands 202 are mapped.

When a user wants to test an application (e.g., a GUI application), the user creates application-specific test data 210. The application-specific test data 210 is used in conjunction with application-specific test cases with a set of test operations 212 as input to test driver 214. Further, the test driver 214 and the application-specific user actions 208 feed an automation translator plugin 216, which is coupled to the test automation tool and maps operations of the application-specific test cases to application-specific user actions. At 218, the test automation tool executes the application-specific user actions 208 using reflection by referencing the application-specific element map 206 and the generic interface commands 202. Basically, the test automation tool reads the application-specific test case 212 and references the application-specific test data 212 to retrieve values for variables of the first user action. Then, the first user action is simulated using the application-specific element map and the generic interface commands. For example, using the Login user command listed above, the translator plugin 216 reads the test operation (i.e., Login) and translates it to a sequence of the generic interface commands (e.g., SetInputField and click). Then, those generic interface commands are translated to a sequence for the test automation tool.

At 220, it is determined whether the first user action produces an exception. If not, then at 222, if there are more user actions in the application-specific test case 212 that have not been performed, then the test automation tool selects a next user action and executes the selected user action using reflection, as indicated above at 218. If there are no more user actions at 222, then a verification manager uses a script to verify the results at 224. For example, a user may supply a sequence that looks to see if a certain element is present or compare text from a text box to a value. The verification sequence may be part of the application-specific test case or may be separate from the application-specific test case. If the test automation is successful, then the verification manager reports success at 226; otherwise, an error is reported at 228.

The verification manager may use the generic interface commands as described herein for the application agnostic GUI verification sequence. For example, a generic interface command may be created for sending a success message (e.g., VerifySuccessMessage), sending an error message (e.g., VerifyErrorMessage) verifying that an element is present (e.g., VerifyElementPresent_<elementLabelfromElementMap>), verifying text from a text box reflects a value (e.g., VerifyTextFrom_<elementLabel>), etc. Thus if the test automation tool is Selenium for example, then VerifyElementPresent_<elementLabelfromElementMap> can be mapped to getText( ) API; VerifyElementPresent_<elementLabel> can be mapped to isDisplayed( ) API; VerfiyMessage can be mapped to assert( ), etc.

If there is an exception at 220, then it is determined whether the exception is from a change in a GUI screen of the application under test at 240. If so, then a screenshot is captured at 232, which may then be used for analysis at 234 to determine if the application element should be updated, if the application-specific test case should be updated, or if the application-specific user actions should be updated. If the error is not due to a change in screen at 230, then an error is reported at 228.

Figure 3:
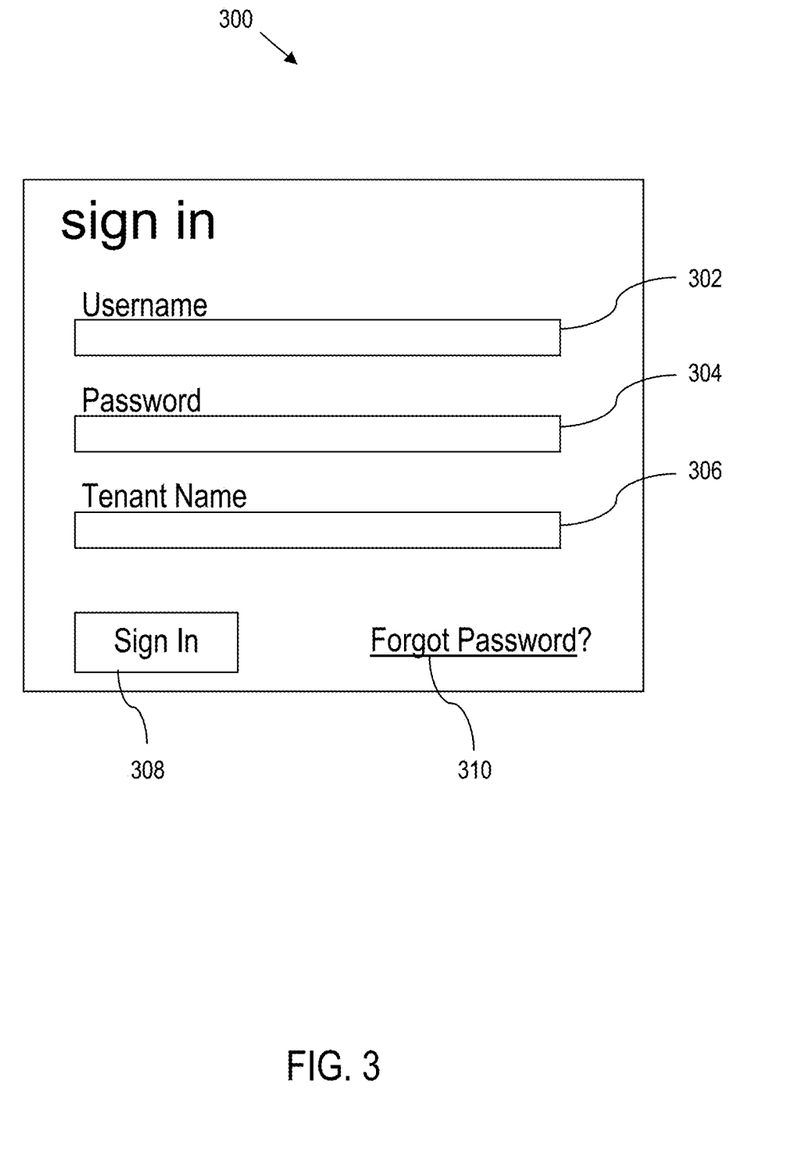
FIG. 3 is an example GUI screen used in an example of the methods of FIGS. 1-2, according to various aspects of the present disclosure.

Referring now to FIG. 3, an example of using generic test automation is provided in reference to the methods of FIGS. 1-2. Generic interface commands are created for different objects that may appear in a GUI screen (not necessarily only the interface commands that may be seen in a specific application under test). In this case, the generic interface commands include: setInputField, click, selectFromList, focus, launch, close, verify, switchToFrame, waitForElementToLoad, and setCheckBox. These generic interface commands are mapped to one or more similar commands within a Selenium test automation tool exposed by an API of the Selenium tool. For example, setInputField and setCheckBox are mapped to sendKeys and check in Selenium, respectively.

Continuing with the example, an application with a screen 300 is under test in the Selenium test automation tool. The screen 300 includes a Username text box 302, a Password text box 304, a Tenant Name text box 306, a Sign In button 308, and a Forgot Password? link 310. Source code for the application is parsed to generate an application-specific element map of the screen, which returns the following application-specific element map.

```
<?xml version="1.0" encoding="UTF-8"?>
<UIElementMap>
<Login>
    <Username type="input" by="ID" value="username" />
    <Password type="input" by="ID" value="password" />
    <TenantName type="input" by="ID" value="tenantId" />
    <SignIn type="button" by="ID" value="attemptLogin" />
    <errorMessage type="output" by="ID" value="formError" />
    <mainnavlink type = "output" by =CSS, value="#main" />
</Login>
...
</UIElementMap>
```

Using the application-specific element-map (i.e., the user-interface element map) and the generic interface commands, application-specific user actions are created. In this case, the following user actions automatically created for this application are:

```
Login = setInputField(username, password, tenant name), click (sign in)
Logout = click(logout)
CreateUser = setInputField(firstname, lastname, userid,
    emailaddr, pwd, confirmpwd), click(submit)
FYP = click(forgotpassword), setInputField(username, otp,
    newpassword, confirmpassword), click(resetPassword)
```

The application-specific user actions may be in any format. As shown above, they are in a list form with a mapping to elements. FIG. 4 illustrates the application-specific user actions in a test case as a spreadsheet. As another example, the application-specific user action may be manually created based on the application-specific element map (without specific mention of the generic user interface commands) in a block form. For example, A login test case can have following simple instructions with Key Value Pairs (keys are label names in Login section of UI Element Map (i.e., application-specific element map), and values to be substituted from the test data):

```
[Login]
Usemame = ${username}
Password = ${password}
TenantName= ${tenant name}
SignIn
```

At run time, the Username, Password and TenantName will be determined as inputs using the "type" parameter in application-specific element map, and the generic interface command SetInputText function will be invoked based on the "input" type. Similarly for SignIn, the "type" parameter has a value of "button." Thus, the generic interface command "click" function will be invoked. The variables (e.g., ${username}, etc.) will be dynamically substituted from the test data.

Also, the application-specific test data may be hard coded in the application-specific test cases for instant execution instead of writing in a spreadsheet (as shown in FIG. 5), XML, etc. For example, a successful login test with an output verification for a presence of a "mainnavlink" element to confirm that the user actually did login onto the screen could look like the following, which provides for quicker verifications in certain cases (e.g., application modifications, bug fixes, etc.):

```
[Login]
Username = Sainath
Password = D0st234!@
TenantName=CA Technologies
SignIn
#output vrification for logged in screen
Mainnavlink
```

Therefore, instead of dynamically substituting the variables in at run-time, the variables are hard coded within the application-specific test case. Further, the "mainnavlink" element is known to be an output from the "type" parameter for mainnavlink within the application-specific element map set to output, as shown above.

Thus, every element in the application-specific element map for the Login screen does not need to be used in creating a user action. Instead, a subset of the elements may be used, as shown above.

The user creates an application-specific test case of test operations, as shown in FIG. 4 and creates application-specific test data that is used to provide values for the application-specific user actions, as shown in FIG. 5. Both the application-specific test case and the application-specific test data are written using a spreadsheet in this example. However, they may be created in any desired format (e.g., XML, Quality Center, etc.). The application-specific test data is used with the application-specific test cases (with a set of test operations) as an input to the test automation tool via a test driver. An automation translator plugin has been coupled to the Selenium test automation tool, so the application-specific user actions (which are based off of the generic interface commands) may be understood by the Selenium tool. Thus, the Selenium test automation tool starts the automation.

The test driver selects the first test operation found in the application-specific test cases, which in this example is Login. Using reflection, invokes the test automation tool (e.g., Selenium) to populate values read from the application-specific test data into the application under test. In this example, the first user action in the sequence of the application-specific test case for the Login operation is setInputField for username, password, and tenantname textboxes, and the second user action for the Login operation is to click on the sign in button The values associated with the first Login data set in the application-specific test data are plugged into the label names within the user action. This first user action will simulate an end user properly entering a valid username, password, and tenant name and clicking the sign in button. Specifically, the username input field (i.e., text box) is set to username1, the password input field is set to valid_pwd, the tenant name input field is set to tenant1, the sign in button is pushed. The user action (which is just a series of interface commands) is then translated from the generic interface commands to the tool (e.g., Selenium) specific commands through the generic interface command map set up earlier. Thus, the Selenium test automation tool can run the user action. As such, it is as if an end-user has typed in "username1" into the username text box, "valid_pwd" into the password text box, "tenant1" into the tenant name text box, and clicked the sign in button.

In this case, there is no exception, so, the Selenium tool determines that there is another user action in the application-specific test cases to be executed, so the Selenium tool selects the next user action in the application-specific test cases, which is another Login action. This user action simulates the end user entering an invalid password. Specifically, the username input field (i.e., text box) is set to username1, the password input field is set to invalid_pwd, the tenant name input field is set to tenant2, the sign in button is pushed, and nothing happens with the forgot password link. Just as before, the user action is translated from the generic interface commands to Selenium specific user commands through the generic interface command map set up earlier. Thus, the Selenium test automation tool can run the user action. As such, it is as if an end-user has typed in "username1" into the username text box, "invalid_pwd" into the password text box, "tenant1" into the tenant name text box, and clicked the sign in button. In this case no exception occurs because the GUI functions properly by indicating that the password is invalid.

When there are no more actions to perform in the application-specific test cases, the verification manager determines whether the test automation was a success. In this case, the verification manager determines that the operation was a success and issues a success message.

If the operation was not a success due to changes in the application, then the application-specific element map may need to be updated to reflect new labels, screens, etc. If that is the case, then the application-specific user actions may need to be updated, which may be done automatically. However, if the application-specific user actions are updated, the application-specific test cases do not necessarily need to updated, because the test cases are independent of the application-specific element map. This reduces the amount of time needed between an application version for test and actual testing, because only minimal changes may need to be changed, instead of having to rewrite the test cases based on the new element map.

Further, if the user decides to run the test in the HP UFT tool (or any other test automation tool), then neither the application-specific test data nor the application-specific test cases need to be rewritten. Instead, a mapping from the generic interface commands to HP UFT commands (instead of the mapping to Selenium, as described in the example) is created as an input to the translator plugin. Thus, application-specific test cases and application-specific test data written for a specific application may be used to test that application regardless of the test automation tool.

Also, if a new version of a test automation tool is released or if an old version of a test automation tool is no longer supported by the manufacturer, then the user may upgrade to a newer version of the test automation tool with a different API by creating a new mapping for the new API for the newer version of the test automation tool. Thus, application-specific test cases and application-specific test data written for a specific application may be used to test that application regardless of the version of the test automation tool.

Moreover, the generic interface commands should include most if not all of the possible commands an end user may perform. Thus, once a generic interface command mapping file is created for a tool, it can be used to test any application.

Still further, the generic interface commands allow a user to write test cases, test data, and verification scripts without knowing any specific scripting language or test automation tool language.

Figure 6:
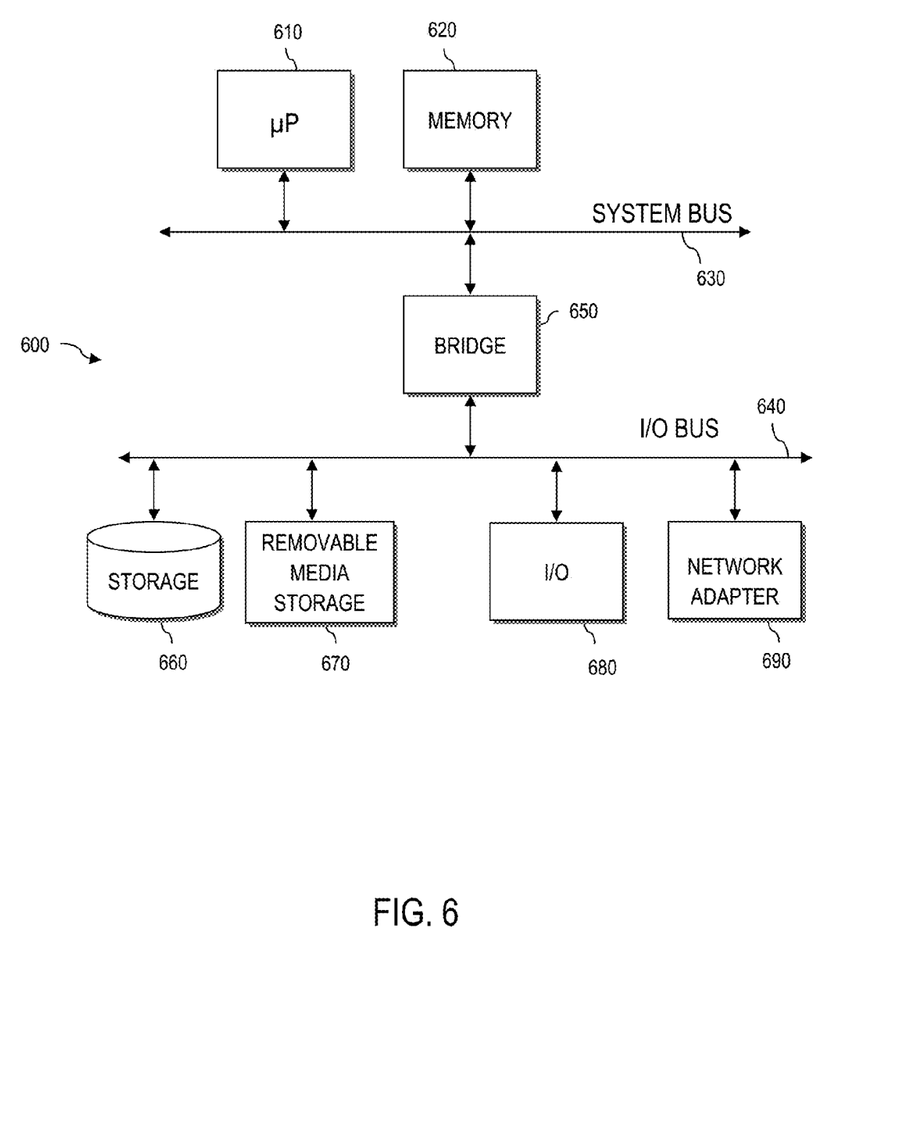
FIG. 6 is a block diagram of a computer system having a computer readable storage medium for implementing functions according to various aspects of the present disclosure as described in greater detail herein.

Referring to FIG. 6, a block diagram of a data processing system is depicted in accordance with the present disclosure. Data processing system 600 may comprise a symmetric multiprocessor (SMP) system or other configuration including a plurality of processors 610 connected to system bus 620. Alternatively, a single processor 610 may be employed. Also connected to system bus 620 is memory controller/cache 630, which provides an interface to local memory 640. An I/O bus bridge 650 is connected to the system bus 620 and provides an interface to an I/O bus 660. The I/O bus may be utilized to support one or more buses and corresponding devices 670, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 680, storage 690 and a computer usable storage medium 695 having computer usable program code embodied thereon. The computer usable program code may be executed to implement any aspect of the present disclosure, for example, to implement any aspect of any of the methods and/or system components illustrated in FIGS. 1-5.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java programming language (Java is a registered trademark owned by Oracle America, Inc. a Delaware Corporation located at 500 Oracle Parkway, Redwood Shores, CA 94065), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A method comprising:
   mapping generic interface commands to tool-specific interface commands of a test automation tool;
   creating an application-specific element map based on an application for test, wherein the application-specific element map is created by parsing source code for the application under test and includes label names for elements of the application-specific element map;
   creating application-specific user actions based on the generic interface commands and the application-specific element map;
   sending the application-specific user actions to the test automation tool for testing the application;
   translating an application-specific test case to the application-specific user actions;
   using values from application-specific test data to populate the application-specific user actions;
   translating the populated application-specific user actions to the generic interface commands to create populated generic interface commands; and
   translating the populated generic interface commands to tool-specific interface commands based on the mapping the generic interface commands to tool-specific interface commands.

2. The method of claim 1, wherein mapping the generic interface commands to tool-specific interface commands of a test automation tool is performed during testing of the application for test.

3. The method of claim 1 further comprising:
   translating the generic interface commands to the tool-specific interface commands during testing of the application for test.

4. The method of claim 1 further including:
   creating the generic interface commands for objects found in graphical user interfaces to be tested further by creating a generic interface command for select one of:
   setting a value of a text box;
   clicking a button; and
   setting a check box.

5. The method of claim 1, wherein mapping the generic interface commands to tool-specific interface commands of a test automation tool further comprises mapping the generic interface commands to tool-specific interface commands of a test automation tool using an application programming interface of the automation tool.

6. The method of claim 1, wherein identifying an application-specific element map based on an application for test, wherein the application-specific element map includes label names for elements of the application-specific element map further comprises identifying an application-specific element map based on an application for test, wherein the application-specific element map includes label names for elements of the application-specific element map based on labels for elements of the source code.

7. The method of claim 1 further comprising:
   mapping the generic interface commands to tool-specific interface commands of a second test automation tool; and
   sending the application-specific user actions to the second test automation tool for testing the application independently of changing the application-specific user actions.

8. The method of claim 1 further comprising:
   verifying results from the test automation tool using the generic interface commands.

9. A system comprising a hardware processor coupled to memory, wherein the processor is programmed for generic test automation by:

mapping generic interface commands to tool-specific interface commands of a test automation tool;
creating an application-specific element map based on an application for test, wherein the application-specific element map is created by parsing source code for the application under test and includes label names for elements of the application-specific element map;
creating application-specific user actions based on the generic interface commands and the application-specific element map;
sending the application-specific user actions to the test automation tool for testing the application;
translating an application-specific test case to the application-specific user actions;
using values from application-specific test data to populate the application-specific user actions;
translating the populated application-specific user actions to the generic interface commands to create populated generic interface commands; and
translating the populated generic interface commands to tool-specific interface commands based on the mapping the generic interface commands to tool-specific interface commands.

10. The system of claim 9, wherein the processor is further programmed to perform:
translating the application-specific user actions to the generic interface commands during testing of the application for test; and
translating the generic interface commands to the tool-specific interface commands during testing of the application for test.

11. The system of claim 9, wherein the processor is further programmed to perform:
creating the generic interface commands for objects found in graphical user interfaces to be tested further by creating a generic interface command for select one of:
setting a value of a text box;
clicking a button; and
setting a check box.

12. The system of claim 9, wherein mapping the generic interface commands to tool-specific interface commands of a test automation tool further comprises mapping the generic interface commands to tool-specific interface commands of a test automation tool using an application programming interface of the automation tool.

13. The system of claim 9, wherein identifying an application-specific element map based on an application for test further comprises receiving the application-specific element map based on an application for test.

14. The system of claim 9, wherein the processor is further programmed to perform:
mapping the generic interface commands to tool-specific interface commands of a second test automation tool; and
sending the application-specific user actions to the second test automation tool for testing the application independently of changing the application-specific user actions.

15. The system of claim 9, wherein the processor is further programmed to perform:
verifying results from the test automation tool using the generic interface commands.

16. Computer-readable hardware with program code stored thereon, wherein the program code instructs a hardware processor to perform:
mapping generic interface commands to tool-specific interface commands of a test automation tool;
creating an application-specific element map based on an application for test, wherein the application-specific element map is created by parsing source code for the application under test and includes label names for elements of the application-specific element map;
creating application-specific user actions based on the generic interface commands and the application-specific element map;
sending the application-specific user actions to the test automation tool for testing the application;
translating an application-specific test case to the application-specific user actions;
using values from application-specific test data to populate the application-specific user actions;
translating the populated application-specific user actions to the generic interface commands to create populated generic interface commands; and
translating the populated generic interface commands to tool-specific interface commands based on the mapping the generic interface commands to tool-specific interface commands.

* * * * *